(12) United States Patent
Kim et al.

(10) Patent No.: US 8,110,949 B2
(45) Date of Patent: Feb. 7, 2012

(54) ELECTRIC DEVICE, WIRELESS POWER TRANSMISSION DEVICE, AND POWER TRANSMISSION METHOD THEREOF

(75) Inventors: Yong Hae Kim, Daejeon (KR); Seung Youl Kang, Daejeon (KR); Myung Lae Lee, Daejeon (KR); Taehyoung Zyung, Daejeon (KR); Jong-Moo Lee, Daejeon (KR); Sang Hoon Cheon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 226 days.

(21) Appl. No.: 12/581,923

(22) Filed: Oct. 20, 2009

(65) Prior Publication Data

US 2010/0301678 A1    Dec. 2, 2010

(30) Foreign Application Priority Data

May 28, 2009    (KR) ........................ 10-2009-0046747

(51) Int. Cl.
*H01F 27/42*    (2006.01)
(52) U.S. Cl. ........................................ 307/104
(58) Field of Classification Search .................... 307/104
See application file for complete search history.

(56) References Cited

U.S. PATENT DOCUMENTS

| | | | |
|---|---|---|---|
| 7,521,890 B2 * | 4/2009 | Lee et al. | 320/108 |
| 2007/0222542 A1 | 9/2007 | Joannopoulos et al. | |
| 2009/0015075 A1 | 1/2009 | Cook et al. | |
| 2010/0052431 A1 | 3/2010 | Mita | |
| 2011/0121778 A1 | 5/2011 | Oyobe et al. | |

FOREIGN PATENT DOCUMENTS

| | | |
|---|---|---|
| JP | 07-161518 | 6/1995 |
| JP | 2000-270501 A | 9/2000 |
| JP | 2009-106136 A | 5/2009 |
| JP | 2009-267223 A | 11/2009 |
| JP | 2010-051137 A | 3/2010 |
| JP | 2010-063245 A | 3/2010 |
| JP | 2010-539876 A | 12/2010 |
| KR | 10-0806562 | 2/2008 |
| KR | 10-2009-0025960 | 3/2009 |
| WO | WO-2009/036406 A1 | 3/2009 |

OTHER PUBLICATIONS

André Kurs et al., "Wireless Power Transfer via Strongly Coupled Magnetic Resonances", Science, vol. 317, pp. 83-86, Jul. 6, 2007.

* cited by examiner

*Primary Examiner* — Robert L. DeBeradinis
(74) *Attorney, Agent, or Firm* — Rabin & Berdo, P.C.

(57) ABSTRACT

Provided is a wireless power transmission device. The wireless power transmission device includes a power coil in which a high frequency current is applied, a transmission coil in which the high frequency current is induced by magnetic induction, the transmission coil configured to generate an non-radiative electromagnetic wave when the transmission coil has the same resonant frequency as an at least one external target device, and a resonant frequency regulator configured to regulate the resonant frequency of the transmission coil. The wireless power transmission device can transmit the power when it has the same resonant frequency as the target device. Therefore, the overheating due to an eddy current may not occur, and the design may be easily varied.

20 Claims, 6 Drawing Sheets

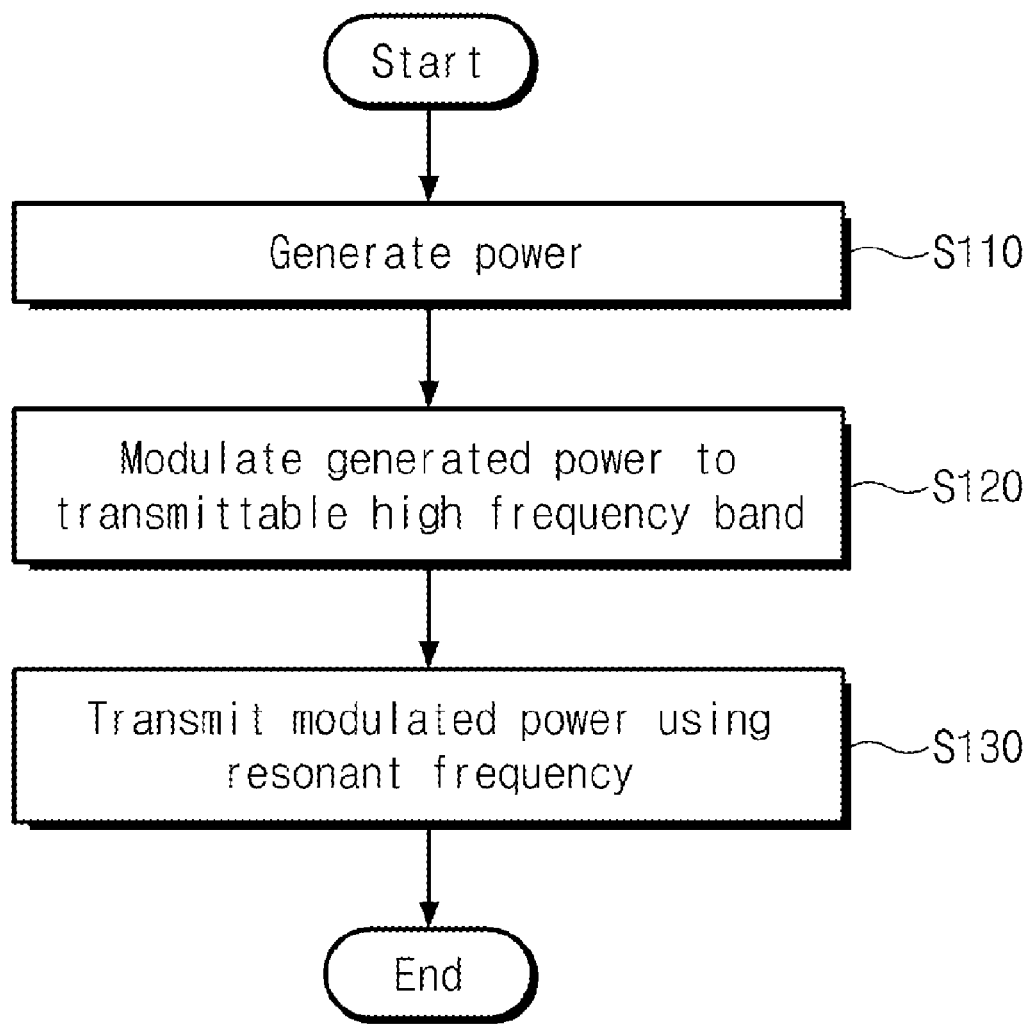

ELECTRIC DEVICE, WIRELESS POWER TRANSMISSION DEVICE, AND POWER TRANSMISSION METHOD THEREOF

CROSS-REFERENCE TO RELATED APPLICATIONS

This U.S. non-provisional patent application claims priority under 35 U.S.C. §119 of Korean Patent Application No. 10-2009-0046747, filed on May 28, 2009, the entire contents of which are hereby incorporated by reference.

BACKGROUND OF THE INVENTION

The present invention disclosed herein relates to an electric device, a wireless power transmission device, and a power transmission method thereof.

Recently, the number of electric products in use, as well as their performance, have increased significantly. Specifically, due to the amazing advances in semiconductor and display technologies, portable electric devices have been miniaturized. However, portable electric devices have limitations in that they receive power through an electric wire. Although a charger is used to charge a product, after the product is used for a predetermined duration, it should be recharged through a wire, due to its limited charge capacity. To overcome this limitation, various wireless charging technologies are being developed. For example, portable electric devices may be charged using radio frequency (RF) or magnetic induction.

Specifically, use of magnetic induction charging of portable electric devices is exemplified in electric shavers produced by Philips Since supplying power wirelessly eliminates the possibility of electrical shorts caused by water, it can be safely used. In addition, eliminating cumbersome wires greatly contributes to aesthetic improvement of a product. However, magnetic induction has a very short charging range, which presents many inconveniences. To overcome the latter, wireless power transmission technologies that use radio frequency (RF) or resonant charging have emerged.

However, wireless power transmission technologies using RF have limitations in that power may be transmitted to only a preset direction because a device for focusing electric waves to a point is required. Also, it should be examined whether high-level RF signals pose harmful effects on health.

SUMMARY OF THE INVENTION

The present invention provides an electric device, a wireless power transmission device, and a power transmission method thereof.

The present invention also provides a wireless power transmission device capable of solving limitations of overheating due to a foreign substance and design flexibility.

Embodiments of the present invention provide wireless power transmission devices including: a power coil in which a high frequency current is applied; a transmission coil in which the high frequency current is induced by magnetic induction, the transmission coil configured to generate an non-radiative electromagnetic wave when the transmission coil has the same resonant frequency as an at least one external target device; and a resonant frequency regulator configured to regulate the resonant frequency of the transmission coil.

In some embodiments, the resonant frequency regulator may adjust a distance between the transmission coils to correct the resonant frequency of the transmission coil.

In other embodiments, the resonant frequency regulator may correct the resonant frequency of the transmission coil by inserting a dielectric between the transmission coils.

In other embodiments of the present invention, electric devices for receiving a power from a wireless power transmission device includes: a receiving coil configured to receive the power through a non-radiative electromagnetic wave generated from the wireless power transmission device when the receiving coil has the same resonant frequency as the wireless power transmission device; and a loading coil configured to receive the power from the receiving coil by a magnetic induction to supply the power to each of target devices, wherein the receiving coil has a spiral structure.

In some embodiments, the electric devices may further include a direct current (DC) converter converting the supplied power to a DC power.

In still other embodiments of the present invention, power transmission methods for transmitting a power from a wireless power transmission device to a target device, the power transmission method including: generating an alternating current (AC) power from the wireless power transmission device; modulating the generated AC power to a wirelessly transmittable high frequency band; and transmitting the modulated power through a non-radiative electromagnetic wave generated when the wireless power transmission device has the same resonant frequency as the target device, wherein the resonant frequency of the wireless power transmission device is adjustable to correspond to that of the target device.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIG. 7 is a flowchart of a wireless power transmission method according to an embodiment of the present invention.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

A wireless power transmission device according to the present invention may realize power transmission when the wireless power transmission device has the same resonant frequency as a target device. Thus, the wireless power transmission device according to the present invention may not cause overheating due to an eddy current and be easily designed when compared to a typical wireless power transmission device.

Figure 1:
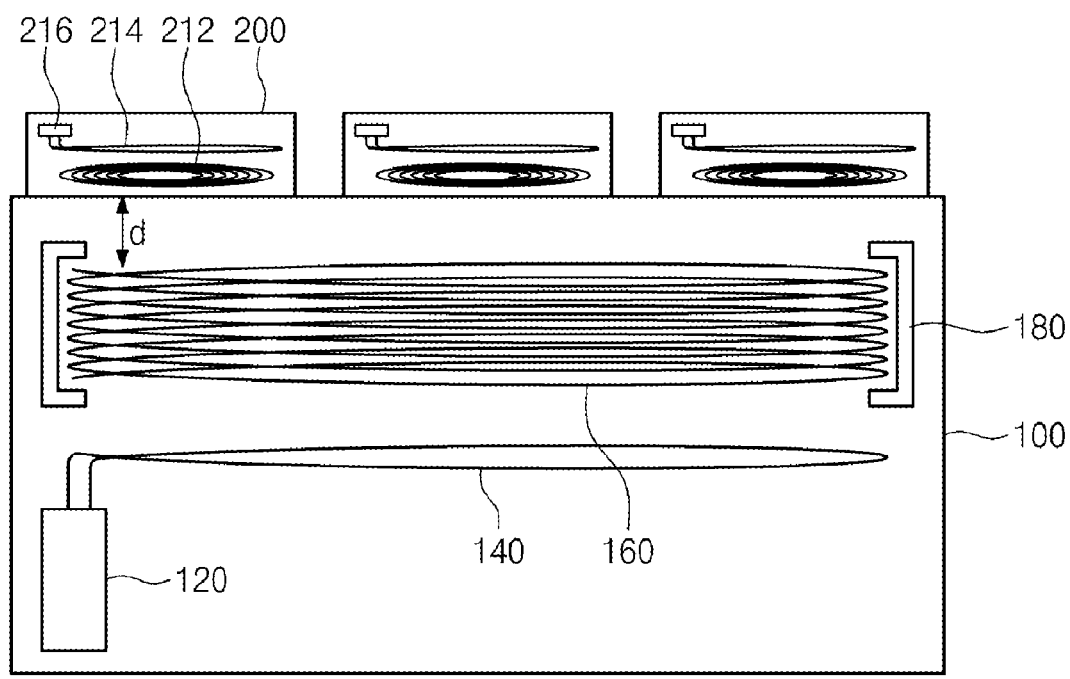
FIG. 1 is a view of a wireless power transmission system according to an embodiment of the present invention.

FIG. 1 is a view of a wireless power transmission system according to an embodiment of the present invention. Referring to FIG. 1, a wireless power transmission system 10 includes a wireless power transmission device 100 for supply a power and a plurality of target devices 200 wirelessly receiving the power from the wireless power transmission device 100 to use the received power. The wireless power transmission device 100 according to the present invention may realize power transmission when the wireless power transmission device 100 has the same resonant frequency as the target devices 200.

Although three target devices are illustrated in FIG. 1, this is just the number of target devices in section. Referring to the plane view of the wireless power transmission device 10 illustrated in FIG. 2, five target devices 200 are illustrated. However, the prevent invention is not limited to the number of target devices. For example, the wireless power transmission system 10 according to the present invention may include at least one target device for wirelessly receiving the power from the wireless power transmission device 100 when the wireless power transmission device 100 has the same resonant frequency as the target devices 200.

The wireless power transmission system 10 may transmit the power using a non-radiative wireless energy transfer technology. According to the non-radiative wireless energy transfer technology, energy may be transferred at a long distance than typical electromagnetic induction and with higher efficiency than typical electromagnetic radiation. The non-radiative wireless energy transfer technology is based on evanescent wave coupling in which electromagnetic waves are transmitted from one medium to another through a near electromagnetic field when the two media have the same resonant frequency. In this case, energy is transferred only when the two media have the same resonant frequency, and unused energy is not radiated in the air but is reabsorbed into the electromagnetic field. Thus, unlike other electromagnetic waves, it is harmless to different peripheral devices or humans.

The wireless power transmission device 100 is a device for wirelessly transmitting a power to the target devices 200. Here, the transmitted power may have an electromagnetic wave having a specific frequency. In addition, the wireless power transmission device 100 may transmit electromagnetic waves having at least one or more frequencies. Also, the wireless power transmission device 100 may discontinuously transmit the power. Specifically, the wireless power transmission device 100 of the present invention may transmit the power through a non-radiative electromagnetic wave generated when the wireless power transmission device 100 has the same resonant frequency as the target devices 200.

The wireless power transmission device 100 includes a power module 120, a power coil 140, a transmission coil 160, and a resonant frequency regulator 180.

The power module 120 is a circuit for modulating an alternating current (AC) power to a high frequency band. The power module 120 may include an RF generator (not shown) modulating an AC power frequency of about 60 Hz to a frequency having MHz band and a high power amplifier (not shown). Also, the power module 120 may include a built-in matching circuit (not shown) that allows the wireless power transmission system 10 to achieve an impedance matching. The wireless power transmission system 10 may maximally transmit the power using the matching circuit.

The power coil 140 may use a coil having a diameter greater than about 3 mm to reduce their resistance. The turn number of the power coil 140 may be 1. Although the turn number of the power coil 140 illustrated in FIG. 1 is 1, the present invention is not limited to the turn number of the power coil.

The transmission coil 160 may use a coil having a diameter greater than 3 mm to reduce power losses due to their resistance. The turn number and turn distance of the transmission coil 160 may be adjusted to correspond to the targeted resonant frequency. For example, the turn number of the transmission coil 160 may be three times to ten times, and the turn distance of the transmission coil 160 may be between about 2 cm and about 10 cm. Since the transmission coil 160 may transmit the power using magnetic induction, the transmission coil 160 may be disposed maximally close to the power coil 140. As shown in FIG. 1, the transmission coil 160 may have a helical structure.

The resonant frequency regulator 180 is a device for correcting the resonant frequency of the transmission coil 160. In general, when objects having the same frequency are disposed close to each other, the resonant frequency may be separated. The resonant frequency regulator 180 is a device for correcting such a separated fine resonant frequency. The resonant frequency regulator 180 may change the turn distance of the transmission coil 160 or insert a dielectric between the transmission coils 160 to vary the resonant frequency.

Figure 3:
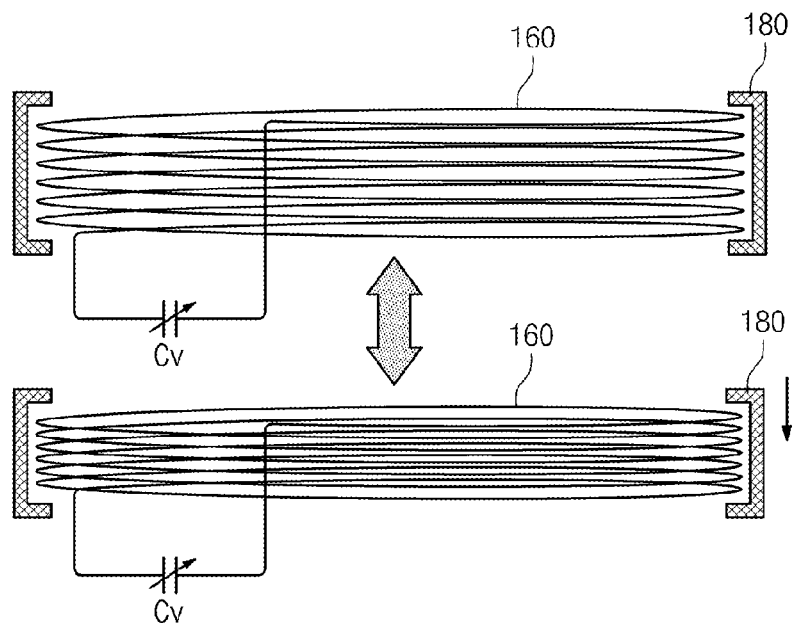
FIG. 3 is a view of a resonant frequency regulator that changes a distance between transmission coils according to an embodiment of the present invention.

FIG. 3 is a view of a resonant frequency regulator that changes a distance between transmission coils according to an embodiment of the present invention. Referring to FIG. 3, a resonant frequency regulator 180 may adjust a distance between transmission coils 160 using a clamp vertically moved to correct a resonant frequency. A variable capacitor Cv may be connected to the transmission coils 160 in series to form a resonant loop.

Figure 4:
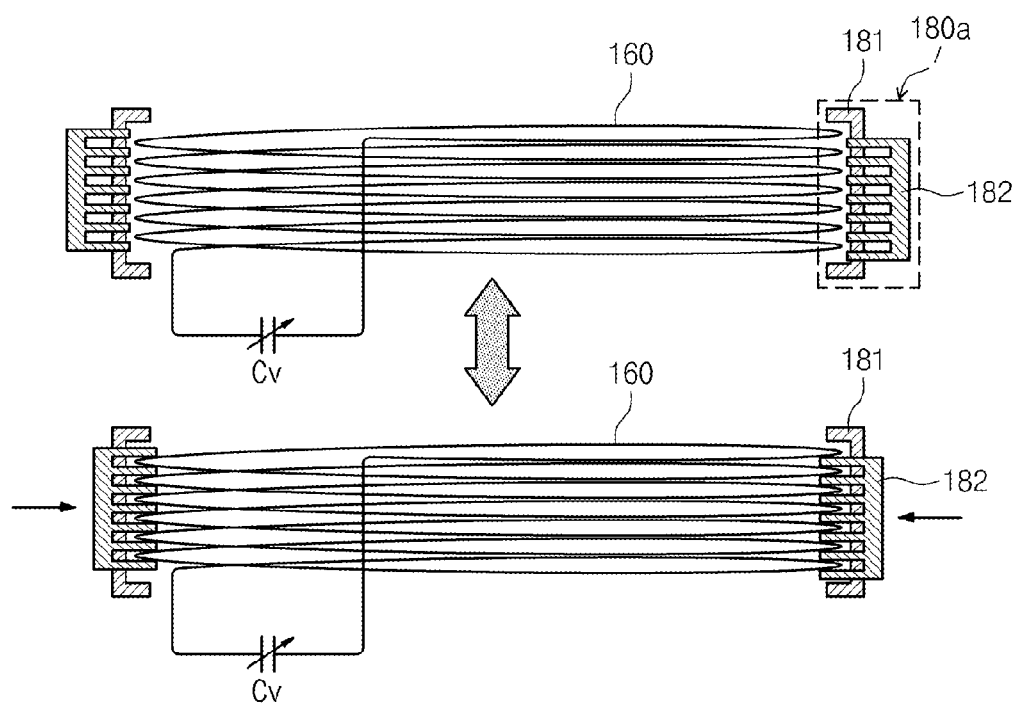
FIG. 4 is a view of a resonant frequency regulator in which a dielectric is inserted between transmission coils according to another embodiment of the present invention.

FIG. 4 is a view of a resonant frequency regulator in which a dielectric is inserted between transmission coils according to another embodiment of the present invention. Referring to FIG. 4, a resonant frequency regulator 180a may include a fixing part 181 for fixing a distance between transmission coils 160 and a dielectric part 182 passing through the fixing part 181 and inserted between the transmission coils 160. The resonant frequency regulator 180a may be configured to insert the dielectric part 182 between the transmission coils 169 to correct a resonant frequency. The fixing part 181 according to the present invention may adjust a distance between the transmission coils 160, like the resonant frequency regulator 180 illustrated in FIG. 3.

The target devices 200 are devices for wirelessly receiving a power from the wireless power transmission device 100. Specifically, the target devices 200 of the present invention may be configured to receive a power transmitted through a non-radiative electromagnetic wave. The target devices 200 may include a variety of electric devices such as a mobile phone and a portable computer. Batteries that are charged using the power received through the non-radiative electromagnetic wave may be provided in the electric devices.

The target devices 200 may be sufficiently spaced from the transmission coil 160 of the wireless power transmission device 100 to prevent magnetic induction from occurring. In addition, the target devices 200 may be disposed within a distance at which resonant wireless power transmission efficiency is superior. The spaced distance d may be between about 10 cm and about 30 cm.

A typical wireless power transmission device was realized using a magnetic induction technology. In the typical wireless power transmission device, a power is supplied to a primary coil by a module disposed in the wireless power transmission device. The primary coil and a secondary coil transmit the power using magnetic induction. The power supplied to the secondary coil is used for operating devices. Here, wireless power transmission efficiency is very high when the wireless power transmission device is very close to the target devices. In general, the transmission distance may be about 1 mm Thus, the typical wireless power transmission device should be maximally close to the target devices.

The magnetic induction may effectively occur in conductive materials. Specifically, the magnetic induction may very effectively occur in magnetic materials. Thus, in the typical wireless power transmission device, in case where a foreign substance falls on a source coil, heat may be generated due to an eddy current. As a result, the wireless power transmission device may break down. In addition, it is difficult to design the typical wireless power transmission device because the wireless power transmission device should be maintained at a distance very close to the target devices.

On the other hand, the wireless power transmission system 10 according to the present invention may use the resonant frequency to realize a power transmission operation between the wireless transmission device and the target devices. As a result, in the wireless power transmission system 10 according to the present invention, the eddy current may not occur even if the foreign substance falls on the wireless power transmission device when compared to the typical wireless power transmission device that transmits the power using the magnetic induction. Thus, the overheating may not occur. Also, since the wireless power transmission system 10 according to the present invention realizes the power transmission operation using the resonant frequency, the distance between the wireless power transmission device and the target devices may be adjusted. As a result, the wireless power transmission system 10 according to the present invention may realize improved design flexibility with respect to the devices.

Figure 5A:
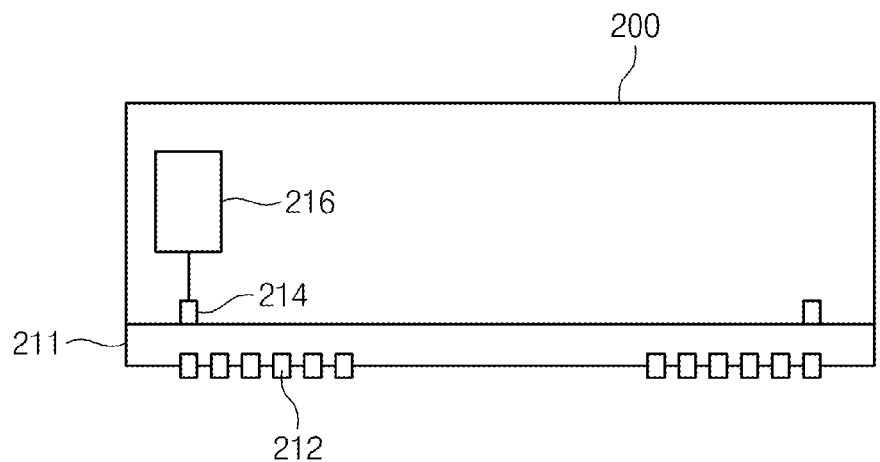
FIG. 5A is a view of a target device according to an embodiment of the present invention.

FIG. 5A is a view of a target device according to an embodiment of the present invention. Referring to FIG. 5A, a target device 200 may include a receiving coil 212, a loading coil 214, and a direct current (DC) converter 216.

Figure 2:
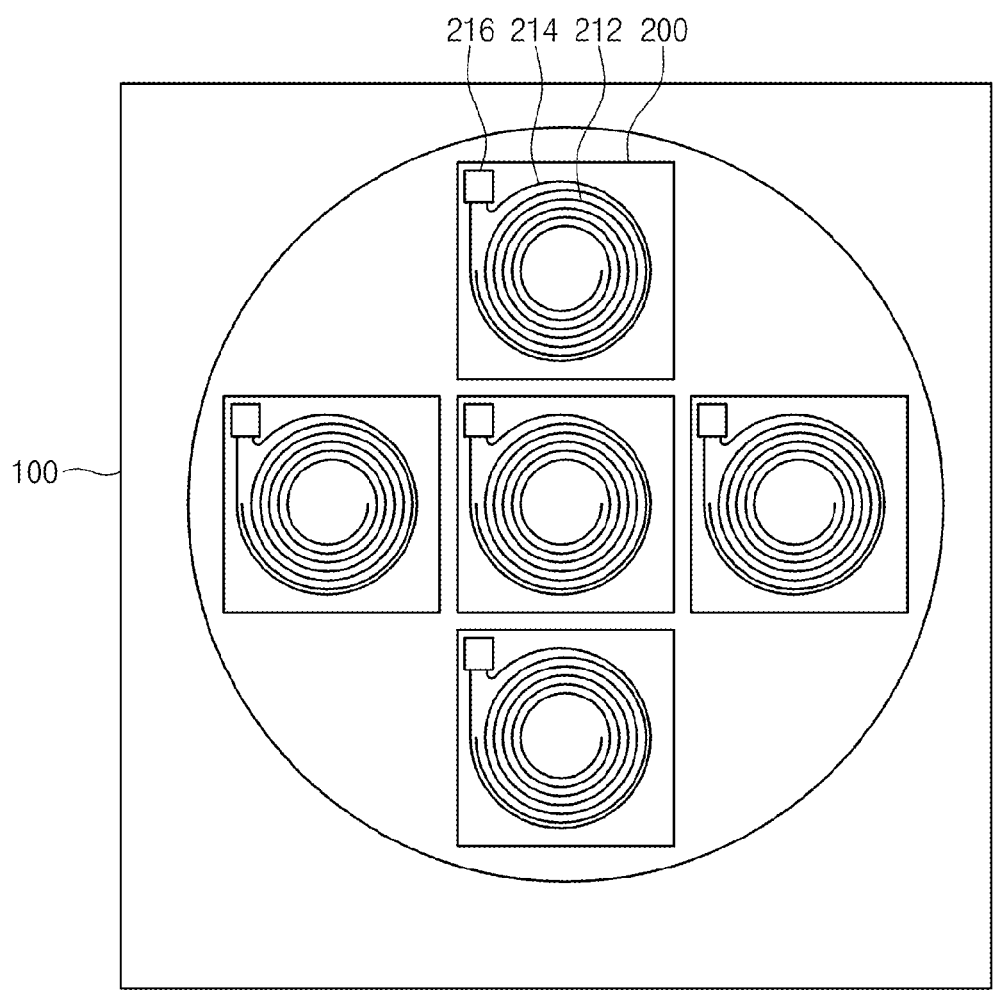
FIG. 2 is a plane view of the wireless power transmission system of FIG. 1.

The receiving coil 212 may receive a power from a transmission coil 160 of a wireless power transmission device 100 when the wireless power transmission device 100 has the same resonant frequency as the target device 200. As shown in FIG. 2, the receiving coil 212 may have a spiral structure. This is done because the target device 200 should be light weight to make it easily portable. In general, a coil having the spiral structure may have a relatively smaller volume than a helical structure.

A thin coil having a diameter of about 0.05 mm to about 0.20 mm is inserted into a PC board 211 instantly melted using ultrasonic waves to manufacture the receiving coil 212. Here, the board 211 may not include only a PC board. For example, the board 211 may include a FRB board having an excellent thermal property. Since the target device 200 is small, the turn number of the receiving coil 212 should be up to about 40 times.

Figure 5B:
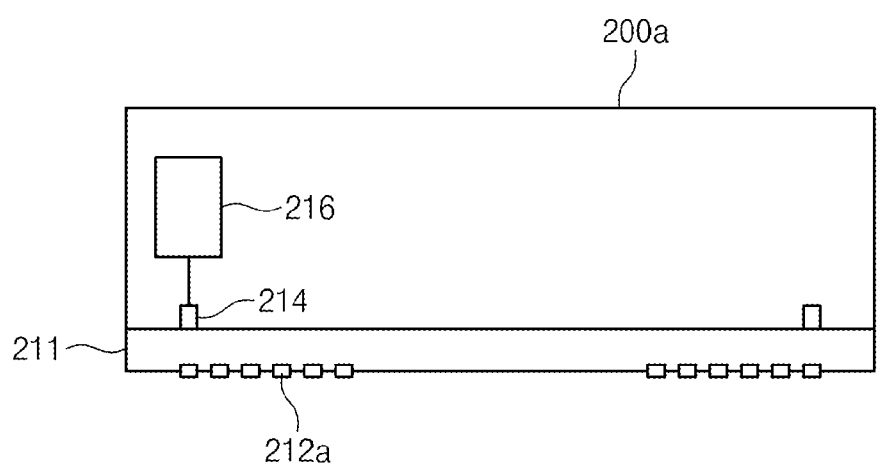
FIG. 5B is a view of a target device according to another embodiment of the present invention.

It is not necessary for the receiving coil 212 to use the ultrasonic waves. For example, the receiving coil 212 may be realized using copper plating as illustrated in FIG. 5B.

The loading coil 214 may be adjacently connected to the receiving coil 212 because a power is transmitted between the loading coil 214 and the receiving coil 212 using magnetic induction. The loading coil 214 may use a 1-turn coil having a diameter of about 3 mm to reduce their resistance. The loading coil 214 may supply an actual power to the target device 200.

The DC converter 216 is a circuit for converting an AC power transmitted from the loading coil 214 to a DC power. The target device 200 may include the DC converter 216, but it may not.

Figure 6:
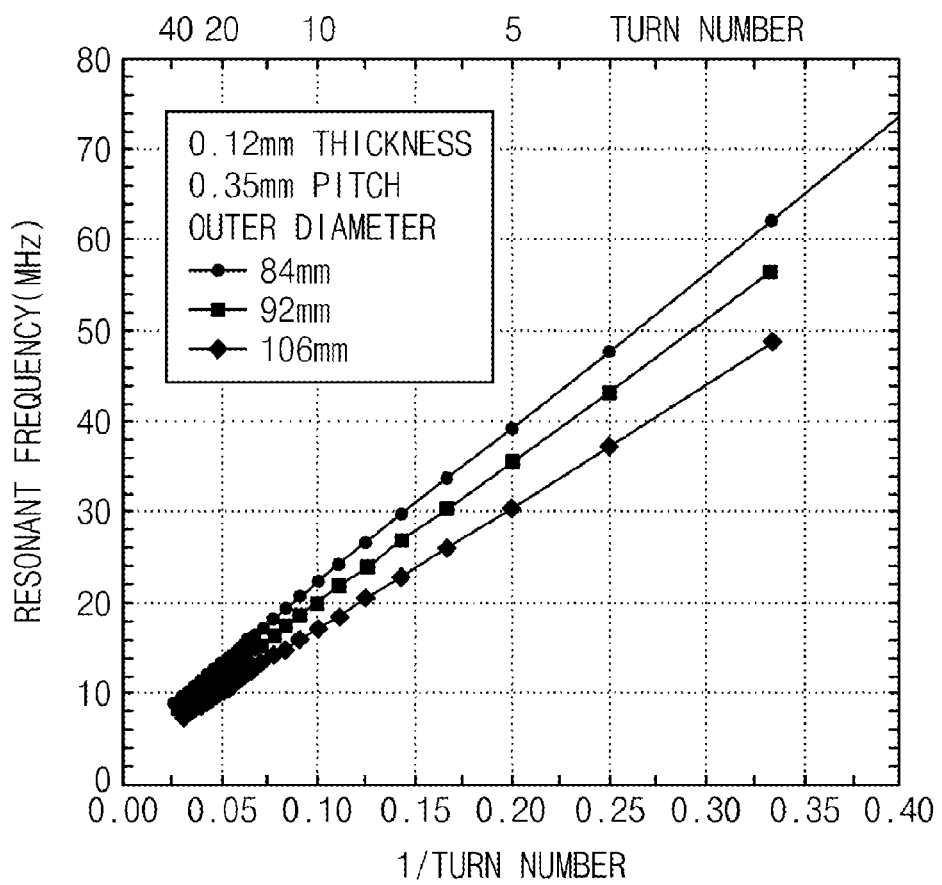
FIG. 6 is a graph illustrating a relationship between a resonant frequency and the turn number of a receiving coil.

FIG. 6 is a graph illustrating a relationship between a resonant frequency and the turn number of a receiving coil. Referring to FIG. 6, as the turn number of a receiving coil increases, a resonant frequency decreases. Also, as a diameter of the receiving coil increases, the resonant frequency decreases. For example, a coil having a diameter of about 106 mm has the lowest resonant frequency, a coil having a diameter of about 92 mm has a middle resonant frequency, and a coil having a diameter of about 84 mm has the lowest resonant frequency.

FIG. 7 is a flowchart of a wireless power transmission method according to an embodiment of the present invention. A wireless power transmission method will be described with reference to FIGS. 1 through 7.

In operation S110, the wireless power transmission device 100 may generate an AC power. In operation S120, the generated AC power may be modulated to a high frequency band that can be wirelessly transmitted by the RF generator. In operation S130, when the wireless power transmission device 100 has the same resonant frequency as the target device disposed on the wireless power transmission device 100, a non-radiative electromagnetic wave may be generated, and thus, the modulated power may be transmitted to the target device through the generated non-radiative electromagnetic wave. Here, the resonant frequency regulators 180 and 180a may perform a regulating operation such that the transmission coil 160 has the same resonant frequency as the target device.

As described above, the wireless power transmission device according to the present invention may transmit the power when the wireless power transmission device has the same resonant frequency as the target device. Therefore, the overheating due to the eddy current may not occur, and the design may be easily varied.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A wireless power transmission device, comprising:
   a power coil to which a first high frequency current is applied;
   a transmission coil in which a second high frequency current corresponding to the first high frequency current is induced by magnetic induction; and
   a resonant frequency regulator configured to adjust a resonant frequency of the transmission coil to equal a resonant frequency of an external target device, wherein the transmission coil is configured to generate a non-radiative electromagnetic wave to transfer power to the external target device when the resonant frequency of the transmission coil is equal to the resonant frequency of the external target device.

2. The wireless power transmission device of claim 1, wherein the transmission coil includes a plurality of transmitting coils and the resonant frequency regulator adjusts a distance between the transmitting coils to adjust the resonant frequency of the transmission coil.

3. The wireless power transmission device of claim 1, wherein the transmission coil includes a plurality of transmitting coils and the resonant frequency regulator adjusts the resonant frequency of the transmission coil by inserting a dielectric between the transmitting coils.

4. The wireless power transmission device as recited in claim 1, wherein the power coil has a diameter greater than about 3 mm and has only one turn.

5. The wireless power transmission device as recited in claim 1, wherein a diameter of the transmission coil is greater than 3 mm.

6. The wireless power transmission device according to claim 1, wherein the transmission coil transfers power to the external target device only when the transmission coil has the same resonant frequency as the external target device.

7. An electric device for receiving power from a wireless power transmission device, comprising:
  a receiving coil inserted into a PC board, the receiving coil being configured to receive the power through a non-radiative electromagnetic wave generated from the wireless power transmission device when the receiving coil has the same resonant frequency as does the wireless power transmission device, the receiving coil having a spiral structure; and
  a loading coil configured to receive the power from the receiving coil by magnetic induction to supply the power to a target device.

8. The electric device for receiving power from a wireless power transmission device as recited in claim 7, wherein the receiving coil has a diameter of about 0.05 mm to about 0.20 mm and is ultrasonically bonded to the PC board.

9. The electric device for receiving power from a wireless power transmission device as recited in claim 7, wherein the receiving coil includes copper plating.

10. The electric device for receiving power from a wireless power transmission device as recited in claim 7, wherein the loading coil has a single turn and has a diameter of about 3 mm.

11. The electric device for receiving power from a wireless power transmission device as recited in claim 10, wherein the receiving coil includes a plurality of turns.

12. The electric device for receiving power from a wireless power transmission device as recited in claim 11, further including a DC converter electrically connected to the loading coil.

13. The electric device for receiving power from a wireless power transmission device as recited in claim 7, wherein the receiving coil receives the power from the wireless power transmission device only when the receiving coil has the same resonant frequency as the wireless power transmission device.

14. A wireless power transmission system comprising:
  an electric device including
    a receiving coil configured to receive power through a non-radiative electromagnetic wave and having a resonant frequency, and
    a loading coil configured to receive the power from the receiving coil by magnetic induction to supply the power to a target device; and
  a wireless power transmission device including
    a power coil to which a first high frequency current is applied,
    a transmission coil in which a second high frequency current corresponding to the first high frequency current is induced by magnetic induction, and
    a resonant frequency regulator configured to adjust a resonant frequency of the transmission coil to equal the resonant frequency of the receiving coil,
    wherein the transmission coil is configured to generate a non-radiative electromagnetic wave to transfer the power to the electric device when the resonant frequency of the transmission coil is equal to the resonant frequency of the receiving coil.

15. The wireless power transmission system of claim 14, wherein the transmission coil includes a plurality of transmitting coils and the resonant frequency regulator adjusts a distance between the transmitting coils to adjust the resonant frequency of the transmission coil.

16. The wireless power transmission device of claim 14, wherein the transmission coil includes a plurality of transmitting coils and the resonant frequency regulator adjusts the resonant frequency of the transmission coil by inserting a dielectric between the transmitting coils.

17. The wireless power transmission system as recited in claim 14, wherein the transmission coil transfers the power to the electric device only when the transmission coil has the same resonant frequency as the receiving coil.

18. A wireless power transmission device, comprising:
  a power coil in which a first high frequency current is applied;
  a transmission coil having a plurality of coils and in which a second high frequency current is induced by magnetic induction; and
  a resonant frequency regulator configured to adjust a resonant frequency of the transmission coil to equal a resonant frequency of an external target device, the resonant frequency regulator adjusting a distance between the plurality of coils of the transmission coil to adjust the resonant frequency of the transmission coil to be equal to the resonant frequency of the external target device,
  wherein the transmission coil is configured to generate a non-radiative electromagnetic wave to transfer power to the external target device when the resonant frequency of the transmission coil is equal to the resonant frequency of the external target device.

19. The wireless power transmission device according to claim 18, wherein the resonant frequency regulator further adjusts the resonant frequency of the transmission coil by inserting a dielectric between the plurality of coils of the transmission coil.

20. The wireless power transmission device according to claim 18, wherein the transmission coil transfers power to the at least one external target device only when the transmission coil has the same resonant frequency as the at least one external target device.

* * * * *